United States Patent
Muniere

(10) Patent No.: US 8,005,477 B2
(45) Date of Patent: Aug. 23, 2011

(54) METHOD FOR IMPROVING QUALITY OF SERVICE MANAGEMENT IN A MOBILE PACKET RADIO COMMUNICATION CELLULAR SYSTEM

(75) Inventor: Vincent Muniere, Meudon (FR)

(73) Assignee: Evolium S.A.S., Paris (FR)

( * ) Notice: Subject to any disclaimer, the term of this patent is extended or adjusted under 35 U.S.C. 154(b) by 0 days.

(21) Appl. No.: 10/506,140

(22) PCT Filed: Mar. 6, 2003

(86) PCT No.: PCT/FR03/00727
§ 371 (c)(1),
(2), (4) Date: Sep. 1, 2004

(87) PCT Pub. No.: WO03/075594
PCT Pub. Date: Sep. 12, 2003

(65) Prior Publication Data
US 2005/0096063 A1    May 5, 2005

(30) Foreign Application Priority Data
Mar. 6, 2002 (FR) ..................................... 02 02859

(51) Int. Cl.
*H04W 36/00* (2009.01)
*H04W 72/00* (2009.01)

(52) U.S. Cl. ..................................... 455/436; 455/452.2

(58) Field of Classification Search .................. 455/436, 455/450, 525, 439, 437, 452.2; 370/395.43, 370/328, 348, 466, 231, 338, 352; 709/226; 379/106.01
See application file for complete search history.

(56) References Cited

U.S. PATENT DOCUMENTS

| | | | | |
|---|---|---|---|---|
| 5,987,105 | A * | 11/1999 | Jenkins et al. | 379/106.01 |
| 6,031,832 | A * | 2/2000 | Turina | 370/348 |
| 6,201,971 | B1 * | 3/2001 | Purnadi et al. | 455/450 |
| 6,487,595 | B1 * | 11/2002 | Turunen et al. | 709/226 |
| 6,647,262 | B1 * | 11/2003 | Demetrescu et al. | 455/436 |

(Continued)

FOREIGN PATENT DOCUMENTS

WO    WO 00 38465 A    6/2000

OTHER PUBLICATIONS

"Digital Cellular Telecommunications System (Phase 2+) (GSM) Universal Mobile Telecommunications System (UMTS); General Packet Radio Service (GPRS) Service Description; Stage 2 (3GPP TS 23.060 Version 4.3.0 Release 4) ETSI TS 123 060 v4.3.0" European Telecommunication Standard, Jan. 2002, pp. 1-198 XP002222634.

"Digital Cellular Telecommunications System (Phase 2+); General Packet Radio Service (GPRS); Base Station System (BSS)—Service GPRS Support Node (SGSN); BSS GPRS Protocol (GSSGP) (3GPP TS 08.18 version 7.4.0 Release 1998) ETSI TS 101 343 v7.4.0" European Telecommunication Standard, Jan. 2002, pp. 1064, XP002222635.

(Continued)

*Primary Examiner* — Patrick N Edouard
*Assistant Examiner* — Kiet Doan
(74) *Attorney, Agent, or Firm* — Sughrue Mion, PLLC

(57) ABSTRACT

Method of improving quality of service management in a packet mode cellular mobile radio system, in which method:
in the event of a change of cell from an old cell to a new cell, information on a quality of service profile negotiated in the old cell is transferred to the new cell, and
an additional quality of service management procedure is also provided, to prevent degraded quality of service if the quality of service profile negotiated in the old cell may not be offered in the new cell.

27 Claims, 1 Drawing Sheet

U.S. PATENT DOCUMENTS

| | | | |
|---|---|---|---|
| 6,771,964 B1 * | 8/2004 | Einola et al. | 455/437 |
| 6,842,462 B1 * | 1/2005 | Ramjee et al. | 370/466 |
| 6,845,100 B1 * | 1/2005 | Rinne | 370/395.43 |
| 6,937,566 B1 * | 8/2005 | Forslow | 370/231 |
| 6,941,141 B2 * | 9/2005 | Park et al. | 455/436 |
| 2001/0046879 A1 * | 11/2001 | Schramm et al. | 455/525 |
| 2002/0107022 A1 * | 8/2002 | Muniere | 455/439 |
| 2004/0085923 A1 * | 5/2004 | Qazi et al. | 370/328 |
| 2004/0176093 A1 * | 9/2004 | Raval et al. | 455/436 |

OTHER PUBLICATIONS

3GPP TS 23.060 Version 4.3.0 Release 4—ETSI TS 123 060 V4.3.0 (Jan. 2002).

* cited by examiner

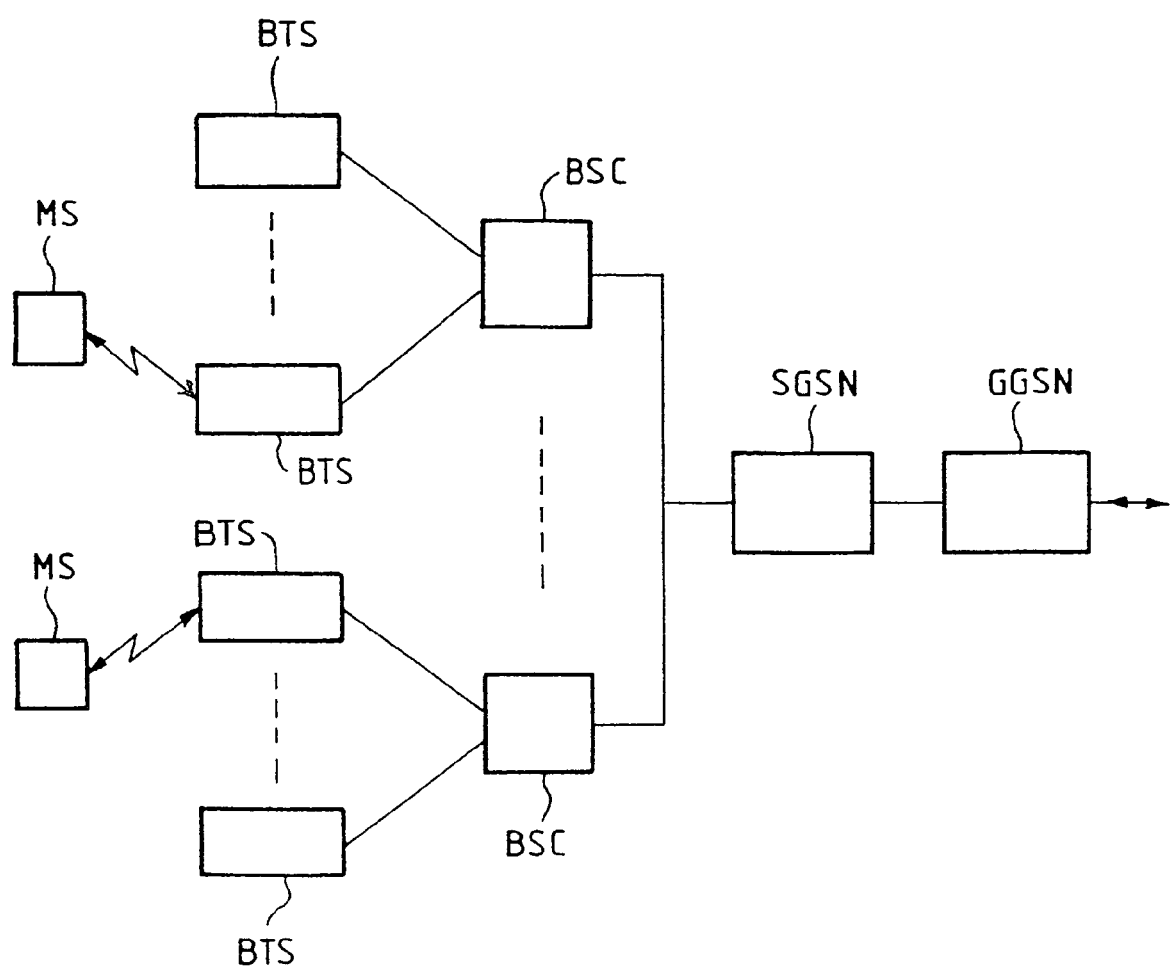
FIG_1

METHOD FOR IMPROVING QUALITY OF SERVICE MANAGEMENT IN A MOBILE PACKET RADIO COMMUNICATION CELLULAR SYSTEM

The present invention relates generally to cellular mobile radio systems.

The present invention relates more particularly to packet mode services such as in particular the General Packet Radio Service (GPRS) for the Global System for Mobile communications (GSM).

The architecture of packet mode systems, such as GPRS systems, for example, is shown in FIG. 1 and essentially comprises:
- base transceiver stations (BTS) communicating with mobile stations (MS) and base station controllers (BSC), the combination of the base transceiver stations and the base station controllers being known as the base station subsystem (BSS) or more generally as the radio access network (RAN), and
- entities such as serving GPRS support nodes (SGSN) communicating with the BSS and with entities such as gateway GPRS support nodes (GGSN), themselves communicating with exterior networks (not shown), the combination of the serving GPRS support nodes and the gateway GPRS support nodes being also known as the network subsystem (NSS) or more generally as the core network (CN).

According to the layered architecture used to describe the above systems, the Um interface between the mobile stations and the base station subsystem comprises:
- a first layer, also known as the physical layer, and
- a second layer, also known as the link layer, which is itself divided into a plurality of layers, namely, in order of increasing level, a medium access control (MAC) layer, a radio link control (RLC) layer, and a logical link control (LLC) layer.

Similarly, the Gb interface between the base station subsystem and the serving GPRS support nodes comprises:
- a first layer, also known as the physical layer, and
- a second layer, also known as the link layer, itself divided into a plurality of layers, namely, in order of increasing level, a frame relay layer, a BSS GPRS protocol (BSSGP) layer, and a logical link control (LLC) layer.

LLC frames are formed in the LLC layer from higher level data units. In LLC frames these data units are known as LLC-protocol data units (LLC-PDU).

The LLC-PDU are segmented in the RLC/MAC layer to form RLC data blocks. The RLC data blocks are then formatted in the physical layer as required for transmission over the Um interface.

Furthermore, procedures for retransmitting data (RLC data blocks and LLC-PDU) that is not received correctly are used in the RLC and LLC layers, respectively, in accordance with an automatic repeat request (ARQ) technique. The correct or incorrect state of the data blocks or units received is signaled by the receiver to the sender by means of acknowledgement (ACK) messages and non-acknowledgement (NACK) messages.

Furthermore, higher level signaling protocols are also provided, in particular for GPRS radio resource (GRR) management, GPRS mobility management (GMM), session management (SM), etc.

For a more detailed description of the above systems see the corresponding standards published by the corresponding standardization organizations.

Moreover, the above systems have a cellular architecture and intercellular transfer techniques are used to transfer circuit mode calls from cell to cell as and when required.

A cell reselection procedure is generally used for packet mode services and there are generally several different cell reselection control modes, corresponding to decreasing degrees of autonomy of the mobile station, or to increasing degrees of control by the network, which amounts to the same thing.

For example, in the GPRS, as indicated in Technical Specifications 3GPP TS 05.08 and 3G TS 04.60 published by the Third Generation Partnership Project (3GPP):
- In a first control mode NC0, the mobile station decides autonomously to effect the above kind of transfer and itself selects the target cell to which the call is to be transferred, taking account of the results of measurements that it carries out.
- In a second control mode NC1, the mobile station decides autonomously to make the above kind of transfer and itself selects the target cell to which the call is to be transferred, taking account of the results of measurements that it carries out, and additionally transmits the measurement results to the network.
- In a third control mode NC2, the network decides to effect the above kind of transfer and selects the target cell to which the call is to be transferred, taking account of the results of measurements transmitted to it by the mobile station.

The control mode NC2 is also known as cell reselection controlled by the network. In this situation, the network instructs the mobile station to effect the cell reselection in a "Packet Cell Change Order" message containing the identity of the reselected cell.

Thus the control modes NC0 and NC1 correspond to a mode of cell reselection controlled by the mobile station. In this situation, the mobile station decides itself to perform cell reselection.

Moreover, a cell change notification (CCN) procedure for mobile stations operating in the NC0 and NC1 modes is defined in Technical Specification 3G TS 44.060. In this situation, the mobile station having decided on cell reselection informs the network (BSS) in a "Packet Cell Change Notification" message of the reselected cell that it proposes. In response to this, the network may in particular indicate the chosen reselected cell in a "Packet Cell Change Order" or "Packet Cell Change Continue" message containing the identity of that cell. The corresponding control mode is also known as cell reselection assisted by the network.

Once the target cell to which to transfer the call in progress has been selected, in any of the above control modes, the mobile station must still access that target cell in packet mode.

For this it is necessary for the mobile station to acquire certain information known as system information broadcast on a common channel in the target cell; as is also specified in the above document, this common channel may be the packet broadcast control channel (PBCCH) or the broadcast control channel (BCCH). If the PBCCH is used, the system information is called packet system information and includes in particular information telling the mobile station how to access the target cell in packet mode. Unlike the handover procedure employed in circuit mode, the resources to be used in the target cell are not predetermined by the network. The system information includes a certain number of parameters for configuring cell reselection. Certain system information is necessary before the mobile station is authorized to perform an access in the target cell, this information differing according to whether it is transported on the PBCCH or the BCCH.

Now, the method of broadcasting the necessary system information on the PBCCH or BCCH is such that the time needed for the mobile station to acquire the information may be extremely long; what is more, this time is not predetermined. This may affect the transfer of data in the downlink direction. This is because the SGSN continues to transfer LLC-PDUs to the BSS, which attempts to deliver them to the mobile station in the form of RLC data blocks. However, because the mobile station is in the process of acquiring the system information relating to the target cell, many RLC data blocks are lost, i.e. are not received by the mobile station. As specified in the standard referred to above, the mobile station is then authorized to suspend the current operations in the old cell for the time needed to receive the required messages on the BCCH or PBCCH of the target cell. Many retransmissions may then be necessary at the level of the RLC/MAC layer and/or the LLC layer, the essential drawback of which is that it delays the transfer of data (and therefore degrades the quality of service), and does not correspond to optimum use of the radio resources.

To limit these drawbacks, according to Technical Specification 3GPP TS 08.18, if the BSS has ordered a mobile station to perform a cell reselection, the following steps may be executed:

the GMM layer supplies a service primitive "GMM-RADIO-STATUS.req" to the BSSGP layer to request it to send a "RADIO-STATUS PDU" message to the SGSN, the "RADIO-STATUS PDU" message is transmitted by the BSS via the BSSGP layer to the SGSN to inform the latter that the network has ordered a cell reselection, the BSSGP layer in the SGSN then supplies a service primitive "GMM-RADIO-STATUS.ind" to the GMM layer to tell it that the BSS has ordered a cell reselection, the SGSN then suspends the transfer of LLC-PDU in the downlink direction (to the mobile station) by sending a service primitive "LLGMM-SUSPEND-REQ" to the LLC layer, and when a cell update message is received from the mobile station, indicating that the cell reselection has been effected successfully, the GMM layer of the SGSN then sends a service primitive "LLGMM-RESUME-REQ" to the LLC layer in order for the transfer of LLC-PDU in the downlink direction to resume.

Furthermore, according to Technical Specification 3GPP TS 08.18, a "FLUSH-LL" procedure comprising the following steps is executed:

when a cell update message is received from the mobile station, indicating that the cell reselection has been effected successfully, the SGSN transmits a "FLUSH-LL PDU" message to the entity of the BSS controlling the old cell, in order to initiate one or the other of the following two procedures: deletion of the LLC-PDU received by the entity controlling the old cell before transmitting the "RADIO STATUS PDU" message and not yet acknowledged if the LLC is operating in acknowledged mode, or transfer of these data units to the entity controlling the new cell, and the entity of the BSS controlling the old cell transmits a "FLUSH-LL-ACK PDU" message to the SGSN indicating if said data units have been deleted or transferred.

Moreover, in the above systems, it is necessary to manage the quality of service (QoS) in such a manner as to satisfy the requirements of users, allowing for different applications and users, and using the available transmission resources as efficiently as possible.

Each service is generally defined by quality of service parameters or attributes (such as a guaranteed bit rate, the transfer delay, etc.), the combination of all these parameters or attributes forming a quality of service profile. Real time services (corresponding to traffic sensitive to transfer delays, such as voice in particular, or streaming traffic) are generally distinguished from non-real time services (corresponding to traffic that is relatively insensitive to transfer delays, such as file transfers in particular). Packet mode systems were originally designed for non-real time services, and developments and improvements now in progress are aimed at optimizing these systems for real time services.

In the case of the GPRS, quality of service management was improved between versions R97 and R99 of the standard.

Under the R97 version of the standard, only non-real time services might be offered to users. Accordingly, in the uplink direction, the mobile station might indicate QoS parameters if it required the setting up of a temporary block flow (TBF) in the uplink direction, using a two-phase access procedure. In the downlink direction, each LLC-PDU received from the SGSN contained a "QoS Profile Information Element" giving limited quality of service information. The BSS might use these parameters to effect some differentiation of services.

The R99 version of the standard introduced a new "BSS Packet Flow Context" procedure, defined in particular in Technical Specifications 3GPP TS 23.060 and 3GPP TS 08.18. This procedure authorizes negotiation between the SGSN and the BSS of all the QoS parameters to be offered for the transfer of any LLC-PDU relating to the packet flow context (PFC) created in this way. The SGSN may aggregate the corresponding transfer of LLC-PDUs to a plurality of given packet data protocol (PDP) contexts in the same PFC. This is possible if the aggregated context PDPs have similar quality of service constraints. The QoS parameters negotiated in this way are defined in the R99 version of the standard and contain much more information than the QoS profile defined in the R97 version. In particular, they contain all the variables necessary for defining a real time service.

Remember that when a session must be set up in a system such as the GPRS, a packet data protocol (PDP) contextual activation procedure must be launched. The PDP context contains the information necessary for transferring data (routing information, QoS profile, etc.) between MS and GGSN. When it activates a PDP context, if the packet flow context function is implemented in the BSS and the SGSN, the latter may request the QoS parameters from the BSS, which is able to negotiate some or all of these parameters as a function of its load and its capacities. This means that the data associated with a PDP context and therefore with a given QoS is correctly identified not only in the core network CN but also in the radio access network RAN. This ensures that the QoS offered for the PDP context is negotiated between all the nodes of the network, and thus it becomes possible to guarantee certain quality of service attributes. It is therefore possible to obtain the offer of a guaranteed bit rate or a maximum transfer delay, so that real time services may be offered.

To support real time applications, the BSS must be capable of offering the required bit rate and also of transferring the LLC-PDUs received within the limits of the maximum transfer delay. For this, there must be as little queuing as possible in the BSS (remember that queuing is specific to the transfer mode used in packet mode systems), and transfer interruptions (caused in particular by cell reselections, as previously mentioned) must be as short as possible. This requires the BSS to know all the QoS specifications for the transfer of such data, in other words that it have a context containing associated QoS profile information.

As specified in Technical Specification 3GPP TS 23.060, the "BSS Packet Flow Context" creation procedure comprises in particular the exchange of the following messages:

"Download BSS Packet Flow Context Request" message, transmitted in the BSS to SGSN direction and containing in particular a mobile station identification and a packet flow Id, "Create BSS Packet Flow Context Request" message, transmitted in the SGSN to BSS direction and containing in particular a mobile station identification, a packet flow Id, and a QoS profile required for a set of PDP contexts that share the same packet flow ("Aggregate BSS QoS Profile Requested"), and "Create BSS Packet Flow Context Acknowledge" message, transmitted in the BSS to SGSN direction and containing in particular a mobile station identifier, a packet flow Id, and a QoS profile negotiated for a set of PDP contexts that share the same packet flow (or "Aggregate BSS QoS Profile Negotiated").

According to the "BSS Packet Flow Context" creation procedure, the SGSN may at any time request the creation of a "BSS Packet Flow Context" (referred to for simplicity hereinafter as a PFC), in particular in the event of activation of a PDP context.

Additionally, if the BSS receives a request to transfer an LLC-PDU in the uplink or downlink direction for which it currently has no PFC, and for which the packet flow identity (PFI) does not indicate a "best effort" QoS, or a short message service (SMS) transfer QoS, or a signaling transfer QoS, or a localization services (LCS) message transfer, then the BSS may initiate the "BSS Packet Flow Context" creation procedure by sending a "Download-BSS-PFC PDU" message to the SGSN. This kind of scenario should occur, in particular, in the event of cell reselection (this is because, a PFC being created on activating a PDP context, this kind of scenario should not occur in this case). Technical Specification 3GPP TS 23.060 indicates that until the BSS receives the PFC, it processes transfers in the uplink and downlink directions in accordance with a default "best effort" QoS profile.

However, Technical Specification 3GPP TS 08.18 indicates that, on execution of the "FLUSH-LL" procedure (see above), the BSS context associated with a mobile station and liable to contain a plurality of PFCs may be retained if the BSS is capable of transferring LLC-PDUs still queued in the old cell to the new cell.

The various procedures or steps executed in the case of cell reselection may therefore be summarized as follows:

In a first step, a transfer is in progress between the SGSN and MS entities.

In a second step, a cell reselection occurs. Functions have been specified in the standard for minimizing the duration of transfer interruptions in the event of cell reselection (in particular the use of the cell reselection assisted by the network procedure, where applicable combined with the NC2 procedure). Moreover, if the change of cell occurs in the same routing area, which is the most probable situation, the LLC-PDUs stored in the old cell may be rerouted to the new cell on the instructions of the SGSN, as indicated by the FLUSH-LL procedure.

Note that although the BSS should not have much real time data stored in its queue under nominal conditions, this may not be the case in the event of cell reselection. This is because, until the SGSN has been informed of a cell reselection by a "Radio Status PDU" message, the SGSN continues to send data to the BSS in the old cell, until it receives a cell update indicating the change of cell. Moreover, the BSS is not authorized to send a "Radio Status PDU" message if the cell reselection assisted by the network procedure is used; in this case, the SGSN therefore does not receive the "Radio Status PDU" message and continues to send LLC-PDUs to the old cell throughout cell reselection.

If rerouting of LLC-PDUs is instructed by the SGSN after it has received a cell update from the mobile station (which is the most probable situation, in order to avoid loss of LLC-PDUs), and if the BSS context may be retained, then the BSS (BSSnew) controlling the new cell, which may be the same as the BSS controlling the old cell, will find in the queue of the mobile station LLC-PDUs containing a PFI associated with that context. In this case, these LLC-PDUs could be transferred with the appropriate QoS because the context is known.

The applicant has noted that a problem may nevertheless arise in the situation where LLC-PDUs may be transferred from the old cell to the new cell but the associated PFCs negotiated for the old cell may not be retained in the new cell (for various reasons, such as in particular a lack of resources in the new cell, etc.). In this case, the SGSN resumes the transfer, but that transfer may be not be assured in the new cell with the appropriate QoS. The BSS will then send this data using a default QoS profile such as a "best effort" profile. If such data corresponds to real time traffic (for example streaming traffic), then the real time constraints cannot be satisfied, which has unacceptable effects at application level.

A requirement therefore exists to avoid such problems, or more generally to improve the management of quality of service in the above kind of system.

A particular object of the present invention is to answer that requirement.

One aspect of the present invention consists in a method of improving quality of service management in a packet mode cellular mobile radio system, in which method:

in the event of a change of cell from an old cell to a new cell, information on a quality of service profile negotiated in the old cell is transferred to the new cell, and an additional quality of service management procedure is also provided, to prevent degraded quality of service if the quality of service profile negotiated in the old cell may not be offered in the new cell.

According to another feature, said transfer of quality of service profile information is requested by a core network entity, in particular a serving GPRS support node (SGSN), of a radio access network entity, in particular a base station subsystem (BSS).

According to another feature, the quality of service profile information transferred corresponds to a base station subsystem context associated with a mobile station and liable to contain a plurality of packet flow contexts (PFC).

According to another feature, the quality of service profile negotiated in the old cell for each packet flow context (PFC) corresponds to an aggregate BSS QoS profile (ABQP).

According to another feature, as soon as there is a base station subsystem context for a mobile station in the old cell, a radio access network entity, in particular a base station subsystem (BSS), assumes that the aggregate BSS QoS profile (ABQP) that has been negotiated in the old cell for each packet flow context (PFC) is required in the new cell by a core network entity, in particular a serving GPRS support node (SGSN).

According to another feature, said additional quality of service management procedure comprises:

a step whereby a core network entity, in particular a serving GPRS support node (SGSN), communicates to a radio access network entity, in particular a base station subsystem (BSS), the relative priority associated with the transfer of quality of service profile information for different packet flow contexts for the same mobile station.

According to another feature, said additional quality of service management procedure comprises:

a step whereby a radio access network entity, in particular a base station subsystem (BSS), communicates to a core network entity, in particular a serving GPRS support node (SGSN), information relating to the feasibility of said transfer of quality of service profile information.

According to another feature, said additional quality of service management procedure comprises:

a step whereby a radio access network entity, in particular a base station subsystem (BSS), communicates to a core network entity, in particular a serving GPRS support node (SGSN), information indicating if the packet flow context(s) (PFC(s)) of a mobile station may be transferred to the new cell or not.

According to another feature, information relating to the feasibility of said transfer of quality of service profile information is communicated for different packet flow contexts for the same mobile station.

According to another feature, said information relating to the feasibility of said transfer of quality of service profile information includes a reason for the quality of service profile information not being transferred.

According to another feature, said information relating to the feasibility of said quality of service profile information transfer includes a quality of service profile that may be offered in the new cell.

According to another feature, said additional quality of service management procedure comprises:

a step whereby, if quality of service profile information may not be transferred, a new packet flow context creation procedure for the new cell is executed, said context being characterized by a quality of service profile adapted to the new cell, and said adaptation taking account of the quality of service profile that the radio access network indicates it is able to offer in the new cell.

According to another feature, said additional quality of service management procedure comprises:

a step wherein, if quality of service profile information may not be transferred, a core network entity, in particular a serving GPRS support node (SGSN), adapts said quality of service profile information and transfer is attempted again after the creation of a new packet flow context.

According to another feature, a core network entity, in particular a serving GPRS support node (SGSN), and a radio access network entity, in particular a base station subsystem (BSS), communicate information necessary for implementing said method by means of a procedure for transferring to the new cell data waiting in the old cell.

According to another feature, said procedure is a "FLUSH-LL" procedure.

According to another feature, said information communicated by said core network entity to said radio access network entity is transmitted in a "FLUSH-LL PDU" message.

According to another feature, said information communicated by said radio access network entity to said core network entity is transmitted in a "FLUSH-LL-ACK PDU" message.

The present invention also consists in a core network entity for a packet mode cellular mobile radio system, in particular a serving GPRS support node (SGSN) entity, comprising means adapted to implement the above method.

The present invention further consists in a radio access network entity for a packet mode cellular mobile radio system, in particular a base station subsystem (BSS) entity, comprising means adapted to implement the above method.

Other objects and features of the present invention will become apparent on reading the following description of embodiments of the invention given with reference to the appended drawing, in which:

FIG. 1 (previously described) is a diagram outlining the general architecture of a GPRS cellular mobile radio system.

Various embodiments of the present invention are described hereinafter for illustrative purposes only.

The FLUSH-LL procedure (as defined in Technical Specification 3GPP TS 08.18) is advantageously used to implement a method of the invention, for example in accordance with either of the following examples.

Firstly, the "FLUSH-LL-PDU" message could contain a list in priority order of PFCs to transfer to the new cell. By virtue of this, the SGSN could indicate the relative importance of the transfer of PFCs to the new cell. This is because, if the mobile station has a plurality of active PFCs but only a limited number of them may be transferred because of a lack of resources in the target cell, it would be preferable for the SGSN to indicate which should be given the highest priority for transfer. An alternative solution would simply be to request a transfer of PFCs to the target cell. The request may be implicit and not require any new field in the "FLUSH-LL-PDU" message.

In other words, the invention proposes to add the following information to the information supplied by the SGSN to the BSSGP during the "FLUSH-LL" procedure:

optionally, if there is a BSS context for the mobile station MS identified by the temporary logical link identifier (TLLI) in the old BSSGP virtual connection identifier (BVCI) corresponding to the old cell, a list of the BSS PFCs in priority order that should be transferred to the new BVCI (corresponding to the new cell). The absence of any such list even though there is a BSS context indicates that the SGSN is requesting the transfer of all of the BSS contexts, with no preference as to which BSS PFCs should be transferred. Whether there is a list in priority order or not, as soon as there is a BSS context for the mobile station MS in the old BVCI, BSS assumes that the aggregate BSS QoS profile (ABQP) that has been negotiated for each PFC in the old BVCI is required by the SGSN in the new cell.

Secondly, the "FLUSH-LL-ACK PDU" message could contain information indicating if the PFC(s) of the mobile station may be transferred to the new cell or not. If it is not possible to transfer them (all), this message could contain:

which PFC(s) it has not been possible to transfer, and for each PFC that it has not been possible to transfer, an indication of the reason (guaranteed bit rate too high, transfer delay too short, etc.); optionally, it would be possible to provide the QoS parameters proposed by the BSS explicitly, assuming that the SGSN has requested the transfer of the PFCs with the same negotiated QoS as that obtained in the old cell, if none of the PFCs of the mobile station could be transferred, because the BSS would not have the capacity for this, then a separate cause might be introduced.

In other words, in response to a "FLUSH-LL PDU" message, the BSS sends a "FLUSH-LL-ACK PDU" message to the SGSN, and the invention proposes to include the following information in this message:

optionally, an indication of which BSS PFCs it has not been possible to transfer to the new BVCI, in the situation where the BSS has not been able to transfer all of the PFCs of the BSS context associated with the mobile station MS identified by the TLLI. For each of these PFCs, the BSS may also include the aggregate BSS QoS profile (ABQP) that may be accepted in the new BVCI. The BSS may not have been able to transfer all the PFCs of the BSS contexts if the available resources or capacities of the BSS in the new BVCI were not sufficient to support the required ABQP.

Thirdly, if the SGSN receives a "FLUSH-LL-ACK PDU" message indicating that it has not been possible to transfer a PFC, and has new LLC-PDUs to send associated with that PFC, then the SGSN could use the "Create BSS PFC" procedure before resuming the transfer. This would avoid transferring LLC-PDUs identified by a PFI that the BSS does not know. The SGSN could also use the failure of the transfer of the PFCs as a reason to adapt the required QoS, instead of having to wait for a "Create BSS PFC NACK" message. If the option to supply the negotiated parameters explicitly in the "FLUSH-LL-ACK PDU" message is used, the procedure would then probably be more efficient.

In other words, on the SGSN receiving a "FLUSH-LL-ACK PDU" message indicating that the LLC-PDUs associated with the old BVC have been "deleted" or "transferred", if it indicates that certain BSS PFCs have not been able to be transferred to the new BVCI, then the SGSN may use that information to create the corresponding BSS PFCs in the new cell before it begins to transfer new LLC-PDUs in the downlink direction for those PFCs. The creation of a BSS PFC is described in section 8a.1. When it creates a BSS PFC that it has not been possible to transfer to the new BVCI, the SGSN may take into account the ABQP that may be accepted in the new BVCI, if it has been received in the "FLUSH-LL-ACK PDU" message.

If the SGSN resumes the transfer of new LLC-PDUs in the downlink direction for a PFC that it has not been possible to transfer to the new BVCI, as soon as it receives the "FLUSH-LL-ACK PDU" message these downlink LLC-PDUs will be processed by the BSS in accordance with a default "best effort" ABQP. The default "best effort" ABQP may lead to a QoS that is unacceptable for the end user of the application.

In other words, the invention proposes in particular to use the FLUSH-LL procedure to indicate to the SGSN if it has been possible to transfer all the PFCs (in which case there is no need to launch a PFC creation procedure) or not. In the situation where it has not been possible to transfer a given PFC, the BSS could indicate the QoS that would be acceptable. The SGSN could then create the PFC in the new cell, taking into account the indication by the BSS of which QoS is acceptable. Once this procedure is finished, the SGSN could resume its transfer.

In another aspect the present invention provides a core network entity, in particular a serving GPRS support node (SGSN) entity, and a radio access network entity, in particular a base station subsystem (BSS) entity, comprising means adapted to implement a method according to the invention.

The particular implementation of such means representing no particular problem for the person skilled in the art, such means need not be described here in more detail than by stating their function, as above.

The invention claimed is:

1. A method of improving quality of service management in a packet mode cellular mobile radio system, the method comprising:
in the event of a change of cell from an old cell to a new cell, transferring information on a quality of service profile negotiated in the old cell to the new cell, and
performing a quality of service management procedure to prevent degraded quality of service if the quality of service profile negotiated in the old cell is not offered in the new cell,
wherein the transferring of the information on the quality of service profile negotiated in the old cell is performed by a base station subsystem (BSS) in response to a request by a serving GPRS support node (SGSN), and
wherein the information on the quality of service profile negotiated in the old cell corresponds to a base station subsystem context which is associated with a mobile station and liable to contain a plurality of packet flow contexts (PFC).

2. The method according to claim 1, wherein the quality of service profile negotiated in the old cell for each packet flow context (PFC) corresponds to an aggregate base station subsystem quality of service profile (ABQP).

3. The method according to claim 2, wherein the base station subsystem (BSS) transfers the aggregate BSS QoS profile (ABQP) that has been negotiated in the old cell for each packet flow context (PFC) to the serving GPRS support node (SGSN) in the new cell.

4. The method according to claim 1, wherein the performing of the quality of service management procedure comprises:
communicating from the base station subsystem to the serving GPRS support node information relating to a feasibility of the transfer of the quality of service profile information negotiated in the old cell.

5. The method according to claim 1, wherein the performing of the quality of service management procedure comprises:
communicating from the base station subsystem to the serving GPRS support node information indicating whether at least one packet flow context of a mobile station may be transferred to the new cell.

6. The method according to claim 5, wherein the performing of the quality of service management procedure further comprises:
if the quality of service profile information may not be transferred, executing a new packet flow context creation procedure for the new cell, said context being characterized by a quality of service profile that a radio access network indicates it is able to offer in the new cell.

7. The method according to claim 1, wherein the serving GPRS support node (SGSN) and the base station subsystem (BSS) communicate information necessary for implementing said method by means of a procedure for transferring to new cell data waiting in the old cell.

8. The method according to claim 7, wherein said procedure is a "FLUSH-LL" procedure.

9. The method according to claim 8, wherein said information communicated by said serving GPRS support node to said base station subsystem is transmitted in a "FLUSH-LL PDU" message.

10. The method according to claim 8, wherein said information communicated by said base station subsystem to said serving GPRS support node is transmitted in a "FLUSH-LL-ACK PDU" message.

11. A core network entity for a packet mode cellular mobile radio system, in particular a serving GPRS support node (SGSN) entity, comprising:
means for, in the event of a change of cell from an old cell to a new cell, requesting from a radio access network entity, in particular a Base Station Subsystem (BSS) entity, a transfer to the new cell of information on a quality of service profile negotiated in the old cell, and
means for performing an additional quality of service management procedure, to prevent degraded quality of service if the quality of service profile negotiated in the old cell may not be offered in the new cell, wherein the quality of service profile information transferred corresponds to a base station subsystem context associated with a mobile station and liable to contain a plurality of packet flow contexts (PFC), wherein said means for performing additional quality of service management procedure comprise:

means for, if quality of service profile information may not be transferred, performing a new packet flow context creation procedure for the new cell, said context being characterized by a quality of service profile adapted to the new cell, and said adaptation taking account of the quality of service profile that the radio access network indicates it is able to offer in the new cell.

12. A core network entity according to claim 11, wherein the quality of service profile negotiated in the old cell for each packet flow context (PFC) corresponds to an aggregate BSS QoS profile (ABQP).

13. A core network entity according to claim 11, wherein said means for performing additional quality of service management procedure comprise:

means for receiving from the base station subsystem (BSS) entity, information relating to the feasibility of said transfer of quality of service profile information.

14. A core network entity according to claim 11, wherein said means for performing additional quality of service management procedure comprise:

means for receiving from the base station subsystem (BSS) entity information indicating if the packet flow context(s) (PFC(s)) of a mobile station may be transferred to the new cell or not.

15. A core network entity according to claim 11, comprising means for communicating necessary information with a radio access network entity, in particular the base station subsystem (BSS) entity, by means of a procedure for transferring to the new cell data waiting in the old cell.

16. A core network entity according to claim 15, wherein said procedure is a "FLUSH-LL" procedure.

17. A core network entity according to claim 15, wherein said information communicated by said core network entity to said radio access network entity is transmitted in a "FLUSH-LL PDU" message.

18. A core network entity according to claim 15, wherein said information communicated by said radio access network entity to said core network entity is transmitted in a "FLUSH-LL-ACK PDU" message.

19. A radio access network entity for a packet mode cellular mobile radio system, in particular a base station subsystem (BSS) entity, comprising:

means for, in the event of a change of cell from an old cell to a new cell, transferring to the new cell information on a quality of service profile negotiated in the old cell, on request of a Core Network entity, in particular a serving GPRS support node (SGSN) entity, and means for performing an additional quality of service management procedure, to prevent degraded quality of service if the quality of service profile negotiated in the old cell may not be offered in the new cell wherein the quality of service profile information transferred corresponds to a base station subsystem context associated with a mobile station and liable to contain a plurality of packet flow contexts (PFC), wherein said means for performing additional quality of service management procedure comprise:

means for, if quality of service profile information may not be transferred, performing a new packet flow context creation procedure for the new cell, said context being characterized by a quality of service profile adapted to the new cell, and said adaptation taking account of the quality of service profile that the radio access network indicates it is able to offer in the new cell.

20. A radio access network entity according to claim 19, wherein the quality of service profile negotiated in the old cell for each packet flow context (PFC) corresponds to an aggregate BSS QoS profile (ABQP).

21. A radio access network entity according to claim 19, wherein as soon as there is a base station subsystem context for a mobile station in the old cell, the radio access network entity assumes that the aggregate BSS QoS profile (ABQP) that has been negotiated in the old cell for each packet flow context (PFC) is required in the new cell by a core network entity, in particular the serving GPRS support node (SGSN).

22. A radio access network entity according to claim 19, wherein said means for performing additional quality of service management procedure comprise:

means for communicating to a core network entity, in particular the serving GPRS support node (SGSN), information relating to the feasibility of said transfer of quality of service profile information.

23. A radio access network entity according to claim 19, wherein said means for performing additional quality of service management procedure comprise:

means for communicating to a serving GPRS support node (SGSN) information indicating if the packet flow context(s) (PFC(s)) of a mobile station may be transferred to the new cell or not.

24. A radio access network entity according to claim 19, comprising means for communicating necessary information with a core network entity, in particular the serving GPRS support node (SGSN), by means of a procedure for transferring to the new cell data waiting in the old cell.

25. A radio access network entity according to claim 19, wherein said procedure is a "FLUSH-LL" procedure.

26. A radio access network entity according to claim 19, wherein said information communicated by said core network entity to said radio access network entity is transmitted in a "FLUSH-LL PDU" message.

27. A radio access network entity according to claim 19, wherein said information communicated by said radio access network entity to said core network entity is transmitted in a "FLUSH-LL-ACK PDU" message.

* * * * *